United States Patent
Mojay (10) Patent No.: US 11,939,054 B2
(45) Date of Patent: Mar. 26, 2024

(54) VERTICAL TAKEOFF AND LANDING AIRCRAFT SURFACE TENSION COMPENSATION SYSTEM

(71) Applicant: HazelAero, Harker Heights, TX (US)

(72) Inventor: Dominique Mojay, Harker Heights, TX (US)

(73) Assignee: HazelAero, Harker Heights, TX (US)

( * ) Notice: Subject to any disclaimer, the term of this patent is extended or adjusted under 35 U.S.C. 154(b) by 0 days.

(21) Appl. No.: 17/842,458

(22) Filed: Jun. 16, 2022

(65) Prior Publication Data

US 2023/0406493 A1    Dec. 21, 2023

(51) Int. Cl.
*B64C 29/00* (2006.01)
*B64C 13/16* (2006.01)
*B64D 45/00* (2006.01)

(52) U.S. Cl.
CPC .......... *B64C 29/0091* (2013.01); *B64C 13/16* (2013.01); *B64D 45/00* (2013.01); *B64D 2045/0085* (2013.01)

(58) Field of Classification Search
CPC ..... B64C 29/0091; B64C 13/16; B64D 45/00; B64D 2045/0085
See application file for complete search history.

(56) References Cited

U.S. PATENT DOCUMENTS

| | | | |
|---|---|---|---|
| 2015/0360775 A1* | 12/2015 | Arai | B64C 29/0075 244/12.1 |
| 2021/0380236 A1* | 12/2021 | Usman | B64C 39/022 |
| 2023/0012961 A1* | 1/2023 | Marusic | F15D 1/0065 |

FOREIGN PATENT DOCUMENTS

WO    2022034681 A1    2/2022

OTHER PUBLICATIONS

English Translation of WO 2022034681 A1 Author: Szalczynski Piotr Miroslaw Title: Unmanned Aircraft Capable of Takeoff/Landing on Water Date: Feb. 17, 2022 (Year: 2022).*
International Search Report and Written Opinion for related International Patent Application PCT/US2023/025579 dated Aug. 3, 2023, 13 pages.

* cited by examiner

*Primary Examiner* — James J Lee
*Assistant Examiner* — Steven Vu Nguyen
(74) *Attorney, Agent, or Firm* — Pillsbury Winthrop Shaw Pittman, LLP (57) ABSTRACT

Provided is a process that includes: obtaining, using one or more surface tension sensors, one or more surface tension measurements of a surface, determining a reaction force for an aircraft using the one or more surface tension measurements and a weight of the aircraft. The process includes causing one or more engines included in the aircraft to generate thrust based on the reaction force.

18 Claims, 6 Drawing Sheets

VERTICAL TAKEOFF AND LANDING AIRCRAFT SURFACE TENSION COMPENSATION SYSTEM

BACKGROUND

1. Field

The present disclosure generally relates to vertical takeoff and landing aircraft technology, and more specifically, the present disclosure relates to systems and methods for surface tension compensation for a surface from which an aircraft vertically takes off and lands, according to various embodiments.

2. Description of the Related Art

A vertical takeoff and landing (VTOL) aircraft is a vehicle that can depart, hover, and land vertically. This includes fixed-wing aircraft with the ability to takeoff and land vertically as well as helicopters, unmanned ariel vehicles, and thrust-vectoring fixed-wing aircraft. VTOL aircraft may be used to land and takeoff from areas that do not have a runway. As such, VTOL aircraft may be used for search and rescue purposes because of their ability to reach remote locations where conventional aircraft and land vehicles cannot access.

SUMMARY

The following is a non-exhaustive listing of some aspects of the present techniques. These and other aspects are described in the following disclosure.

Some aspects include a process including: obtaining, by a computer system and using one or more surface tension sensors, one or more surface tension measurements of a surface; determining, by the computer system, a reaction force for an aircraft using the one or more surface tension measurements and a weight of the aircraft; and causing, by the computer system, one or more engines included in the aircraft to generate thrust based on the reaction force.

Some aspects include a tangible, non-transitory, machine-readable medium storing instructions that when executed by a data processing apparatus cause the data processing apparatus to perform operations including the above-mentioned process.

Some aspects include an aircraft, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of vertical takeoff and landing (VTOL) aircraft and surface tension sensing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In various embodiments of the present disclosure, systems and methods are disclosed for surface tension compensation in VTOL aircraft. As discussed above, VTOL aircraft may be used for search and rescue purposes because of their ability to reach remote locations where conventional aircraft and land vehicles cannot access. Often, remote locations where VTOL aircraft are deployed include chaotic water hazards. For example, disaster-stricken areas from floods or hurricanes are covered in water. Remote locations often include swamps and lakes. Due to dense forests and vegetation in these locations, water may provide the only option for landing a VTOL aircraft. However, landing and taking off from water surfaces in VTOL aircraft is dangerous. The water is often turbulent and does not provide a stable surface for VTOL aircraft to 'push' itself above the surface. Inefficient thrust is often generated to perform takeoff and landing maneuvers. Furthermore, surface tension of the water creates an additional force for the VTOL aircraft to overcome even when the VTOL aircraft is not in contact with the water.

Systems and method of the present disclosure provide for surface tension compensation for VTOL aircraft. A surface tension compensation system included on a VTOL aircraft includes surface tension sensors that are used to determine a surface tension of the takeoff or landing surface and assess the amount of thrust needed to land and takeoff above a surface such as a water surface or other fluid surface (e.g., a gas, liquid, or combination of gas and liquid surface). The surface tension force is used to calculate a reaction force for the VTOL aircraft. Thrust and direction is then calculated and produced in the propulsion system included in the VTOL aircraft. For example, the propulsion system may include at least one ducted fan system where each ducted fan system includes one or more engines and one or more fans. The calculated thrust and direction may be distributed amongst the at least one ducted fan system. Due to continuous change in the fluid surface, the surface tension, and thus the thrust and direction of the VTOL aircraft, may be periodically recalculated during the takeoff or landing. The recalculation may be performed at a predetermined time interval or when a recalculation condition exists. In some embodiments, the recalculation condition may be determined based on the environmental conditions in which the VTOL aircraft is located. The surface tension compensation system and its surface tension sensors may be activated during a takeoff mode or a landing mode and deactivated when the VTOL aircraft is no longer in the takeoff mode or the landing mode or when the VTOL aircraft is otherwise in an alternative mode such as a flight mode.

Figure 1A:
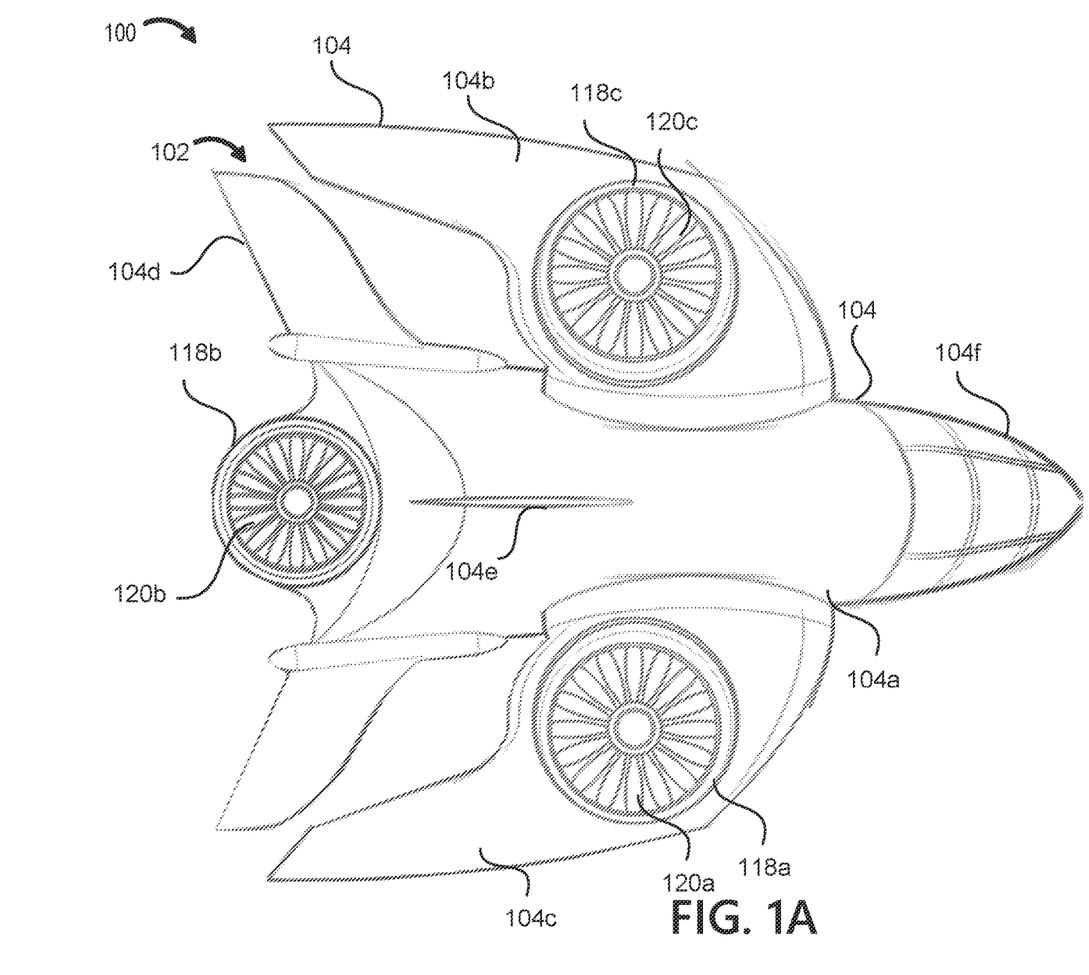
FIG. 1A illustrates a plan-view of a vertical takeoff and landing (VTOL) aircraft that is included in a VTOL surface tension compensation system, in accordance with some embodiments of the present disclosure.
Figure 1B:
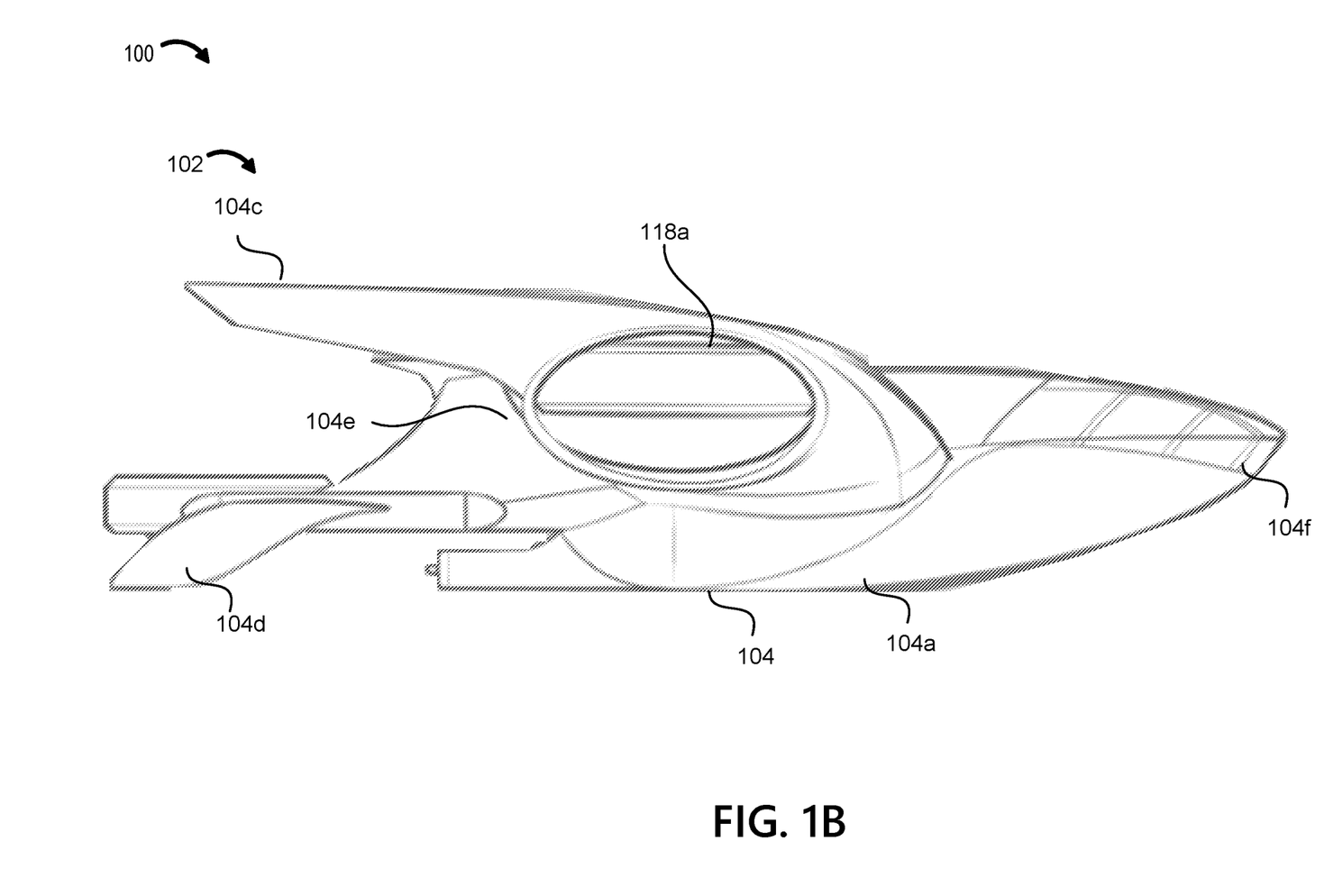
FIG. 1B illustrates an elevation-view of the VTOL aircraft of FIG. 1A, showing the VTOL aircraft from a side, in accordance with some embodiments of the present disclosure.
Figure 1C:
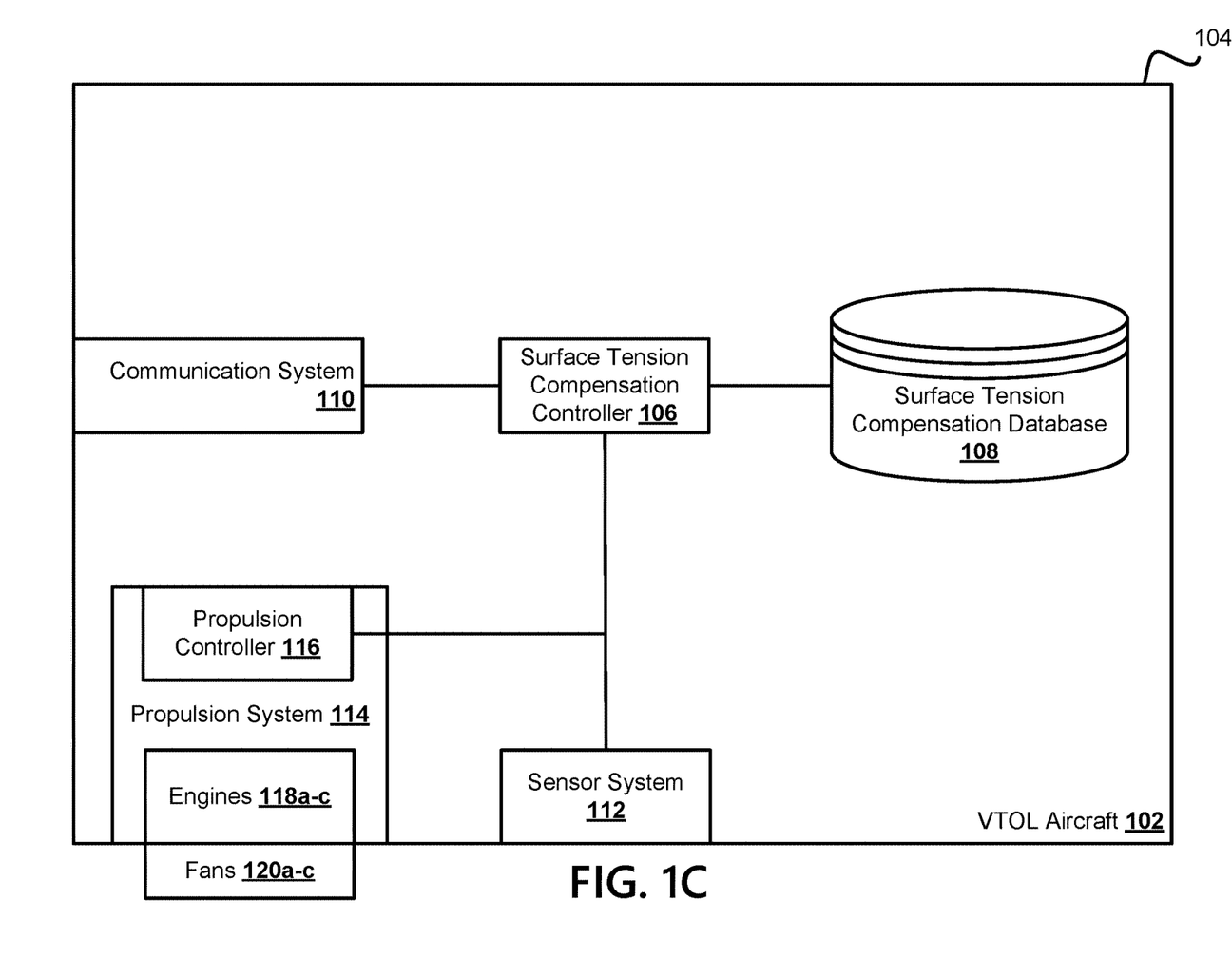
FIG. 1C illustrates a block diagram illustrating components of the VTOL surface tension compensation system that includes the VTOL aircraft of FIG. 1A and FIG. 1B, in accordance with some embodiments of the present disclosure.

Referring now to FIGS. 1A, 1B, and 1C, an embodiment of a vertical takeoff and landing (VTOL) aircraft surface tension compensation system 100 is illustrated. The VTOL aircraft surface tension compensation system 100 may include a VTOL aircraft 102. The VTOL aircraft 102 may be any manned or unmanned aircraft that has the capability to takeoff or land vertically. In some embodiments, this may include autonomous or semiautonomous aircraft including drones or unmanned ariel vehicles (UAVs). The VTOL aircraft 102 may include a VTOL aircraft chassis 104. In some embodiments, the VTOL aircraft chassis 104 may include or define a fuselage 104a, a first wing 104b, a second wing 104c, a vertical stabilizer 104d, a horizontal stabilizer 104e, a cockpit 104f, or any other VTOL aircraft chassis component that would be apparent to one of skill in the art in possession of the present disclosure. While a particular VTOL aircraft chassis 104 is illustrated, one of skill in the art in possession of the present disclosure will recognize that other VTOL aircraft may be contemplated that include fewer or more VTOL aircraft chassis components than what is illustrated in FIGS. 1A-1C and described herein.

Furthermore, while illustrated and discussed as a VTOL aircraft surface tension compensation system 100, one of skill in the art in possession of the present disclosure will recognize that the functionality of the VTOL aircraft surface tension compensation system 100, discussed below, may be provided by other devices other than a VTOL aircraft that are configured to operate similarly as discussed below. In the illustrated embodiment, the VTOL aircraft surface tension compensation system 100 includes the VTOL aircraft chassis 104 that houses the components of the VTOL aircraft surface tension compensation system 100, only some of which are illustrated in FIG. 1C. For example, the VTOL aircraft chassis 104 may house a processing system (not illustrated but may be provided by a processor) and a memory system (not illustrated but may be provided by system memory (e.g., random access memory (RAM) devices such as dynamic RAM (DRAM), synchronous DRAM (SDRAM), solid state memory devices, or a variety of other memory devices known in the art) that is coupled to the processing system and that includes instructions that, when executed by the processing system, cause the processing system to provide a surface tension compensation controller 106 that is configured to perform the functionality of the surface tension compensation controller, the VTOL aircraft, or VTOL aircraft surface tension compensation systems discussed below.

The VTOL aircraft chassis 104 may also house a storage system (not illustrated, but which may include mass storage devices that may include hard discs, optical disks, magneto-optical discs, solid-state storage devices, or a variety other mass storage devices known in the art) that is coupled to the surface tension compensation controller 106 (e.g., via a coupling between the storage system and the processing system) and that includes a surface tension compensation database 108 that is configured to store any of the information utilized by the VTOL aircraft surface tension compensation system 100 and the surface tension compensation controller 106, discussed below. The VTOL aircraft chassis 104 may also house a communication system 110 that is coupled to the surface tension compensation controller 106 (e.g., via a coupling between the communication system 110 and the processing system) and that may be provided by a Network Interface Controller (NIC), wireless communication systems (e.g., BLUETOOTH®, Near Field Communication (NFC) components, WiFi components, etc.), or any other communication components that would be apparent to one of skill in the art in possession of the present disclosure. In a particular embodiment, the communication system 110 may include a communication interface (e.g., a relatively long-range or relatively high-power transceiver(s)) that is configured to provide communication with networks. For example, the communication interface may be configured to operate according to a satellite communication protocol, a microwave communication protocol, a cellular communication protocol or other protocols that would be apparent to one of skill in the art in possession of the present disclosure.

The VTOL aircraft chassis 104 may also house or provide the sensor system 112. The sensor system 112 may include one or more surface tension sensors. For example, the surface tension sensor may include a quasi-elastic laser scattering (QELS) system that may determine surface tension by outputting a laser beam from a laser at a surface. Scattered light may then be captured by a photodiode and an output of the photodiode is provided into a spectrum analyzer that may output frequency measurements. Using Lamb's equation, surface tension may be calculated. Lamb's equation may be represented by:

$$f = \frac{1}{2\pi}\sqrt{\frac{\gamma \cdot q^3}{\rho_1 + \rho_2}}$$

where f is the frequency, q denotes to a wavenumber, $\gamma$ refers to interface tension and $\rho_1$ and $\rho_2$ denote the densities of a first fluid and a second fluid. The QELS system may include the apparatus and methods discussed in Chung, Myungwha, Et al, "Optical Surface Tension Measurement of Two-Dimensionally Confined Liquid Surface," Anal. Chem. (2017), incorporated by reference herein in its entirety. In various embodiments of the present disclosure, the QELS system may be obtaining a reflection of the laser and turn that one-dimensional/quasi two-dimensional element and turn it into a three-dimensional space. Specifically, an assumption may be made in the liquid characteristics to get turn the tension into a two-dimensional vector equation from the two-dimensional equation, another element is added such that it becomes a three-dimensional force.

While the surface tension sensor may include a QELS system, the surface tension sensor may be provided by other surface tension sensors. For example, the surface tension sensor may include a force tensiometer that includes a probe that interacts with the liquid-gas interface or liquid-liquid interface. In other examples, optical tensiometers or other surface tension sensors that would be apparent to one of skill in the art in possession of the present disclosure may provide the surface tension sensor. In various embodiments, the sensor system 112 may include other sensors such as a geolocation sensor (e.g., a global positioning system (GPS) receiver, a real-time kinematic (RTK) GPS receiver, a differential GPS receiver, a Wi-Fi based positioning system (WPS) receiver, an accelerometer, a gyroscope, a compass, or any other sensor for detecting or calculating orientation, position, or movement), a beacon sensor, ultra-wideband sensors, a camera, a barometric pressure sensor, a compass, an inertial measurement unit (e.g., a six axis IMU), a depth sensing camera (for example based upon projected structured light, time-of-flight, a lidar sensor, or other approaches), other imaging sensors (e.g., a three-dimensional image capturing camera, an infrared image capturing camera, an ultraviolet image capturing camera, similar video recorders, or a variety of other image or data capturing devices that may be used to gather visual information from a physical environment surrounding the VTOL aircraft 102), biometric sensors, an actuator, a pressure sensor, a temperature sensor, an audio sensor, an anemometer, a chemical sensor (e.g., a carbon monoxide sensor), or any other sensor that would be apparent to one of skill in the art in possession of the present disclosure.

In various embodiments, the VTOL aircraft chassis 104 houses a propulsion system 114. The memory system may include instructions that, when executed by the processing system, cause the processing system to provide a propulsion controller 116. The propulsion controller 116 may control the thrust and, in some instances, direction of one or more engines 118 that each rotate one or more fans 120. As such, the propulsion system 114 may include one or more ducted fan systems to provide the propulsion of the VTOL aircraft 102. While a specific VTOL aircraft surface tension compensation system 100 has been illustrated, one of skill in the art in possession of the present disclosure will recognize that VTOL aircraft (or other devices operating according to the teachings of the present disclosure in a manner similar to that described below for the VTOL aircraft surface tension compensation system 100) may include a variety of components or component configurations for providing the functionality discussed below, while remaining within the scope of the present disclosure as well.

Figure 2:
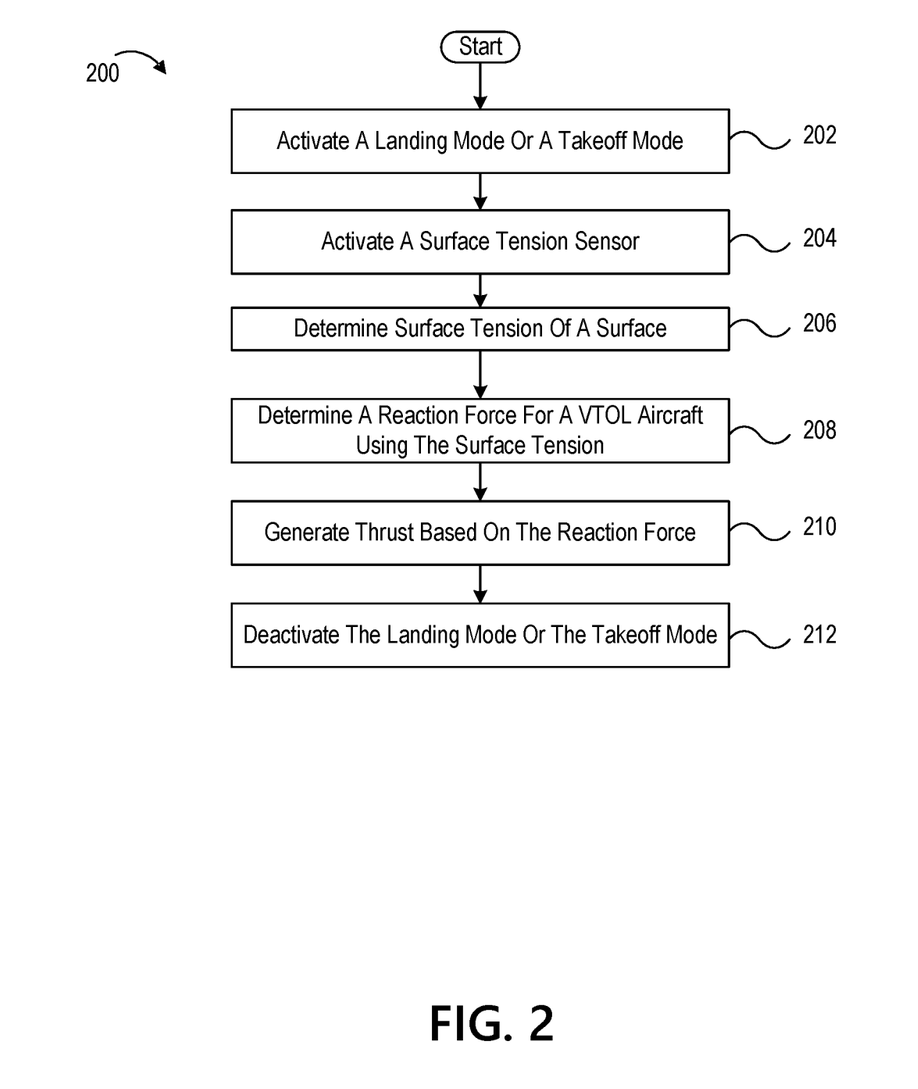
FIG. 2 illustrates a flow diagram showing steps of an example method for performing surface tension compensation, in accordance with some embodiments of the present disclosure.

Referring now to FIG. 2, a method 200 of surface tension compensation is illustrated. Operations described relative to FIG. 2 may be performed, in various embodiments, by any suitable computer system or combination of computer systems, included in the VTOL aircraft surface tension compensation system 100 of FIG. 1. Also, operations described below may be discussed relative to the VTOL aircraft 102 of FIG. 1. Further, various elements of operations discussed below may be modified, omitted, or used in a different manner or different order than that indicated.

The method 200 may begin at block 202 where a landing mode or a takeoff mode is entered. In an embodiment, at block 202, the surface tension compensation controller 106 or another controller (e.g., the propulsion controller) provided in the aircraft may activate a landing mode or a takeoff mode. For example, the takeoff mode may be activated, via the sensor system 112, when the VTOL aircraft 102 satisfies one or more takeoff conditions (e.g., the sensor system 112 detects that the aircraft is on a surface and may continue until the VTOL aircraft 102 reaches some predetermined altitude). A landing mode may be determined when the VTOL aircraft 102 satisfies one or more landing condition (e.g., the aircraft is descending and has reached a predetermined altitude). In some embodiments, a user may manually activate the landing mode or the takeoff mode via a command through a user interface coupled to the VTOL aircraft 102. While a few examples of the one or more landing conditions or the one or more takeoff conditions are described, one of skill in the art in possession of the present disclosure will recognize that other landing conditions or takeoff conditions may be contemplated when activating the landing mode or the takeoff mode for the VTOL aircraft 102 and fall under the scope of the present disclosure.

The method 200 may then proceed to block 204 where a surface tension sensor is activated in response to the VTOL aircraft being in a takeoff mode or a landing mode. In an embodiment, at block 204, the surface tension compensation controller 106 may activate the surface tension sensor included in the sensor system 112. The surface tension sensor may be activated in response to the VTOL aircraft being in the takeoff mode or the landing mode. For example, in some embodiments, activating the surface tension sensor may include deploying one or more probes included in the force tensiometer. In other embodiments, the QELS system may be activated such that one or more lasers are turned on and other components of the surface tension sensor are powered on or exit a power saving mode. In some embodiments, the surface tension sensor included in the sensor system 112 may only be activated when a surface is detected that requires surface tension compensation (e.g., a computer vision algorithm using images generated by a camera in the sensor system 112 that recognizes a fluid surface over a solid surface).

The method 200 may then proceed to block 206 where surface tension of the surface the VTOL aircraft is landing on or taking off from is determined. In an embodiment, at block 206, the surface tension compensation controller 106 may receive one or more surface tension readings from the surface tension sensor included in the sensor system 112. For example, the QELS system may calculate a surface tension using Lamb's equation, discussed above. In other embodiments, the surface tension compensation controller 106 may perform the calculations from data obtained from the spectrum analyzer included in the QELS system. In other examples, the surface tension compensation controller 106 may obtain the surface tension from a force tensiometer or other surface tension sensor.

The method 200 may then proceed to block 208 where a reaction force is determined from the surface tension. In an embodiment, at block 208, the surface tension compensation controller 106 may determine a reaction force needed to descend or elevate the VTOL aircraft based on the surface tension. The reaction force may be calculated using the following conversion method:

$$T = \frac{F_s}{L}$$

Surface tension (T) is equal to the potential reactionary force of the liquid ($F_s$) divided by the length of the visual studied surface (L) (e.g., the length of the area that a surface tension sensor can detect) As such, as the altitude of the VTOL aircraft increases the length increases due to more area of the field of view), which means that the surface tension also decreases as altitude increases. The force of thrust ($F_T$) is equal to velocity of the VTOL aircraft 102 multiplied by the mass flow rate ($\dot{m}$) or $$\left(\frac{dm}{dt}\right):$$

$$F_T = v \cdot \dot{m}$$

$F_s$ and $F_T$ may relate to each other in a way that $F_T$ is greater than or equal to $F_s$, which creates the relation of:

$$T = \frac{v \cdot dm}{L \cdot dt}$$

The unit length may be of a finite area, not the entire area of a surface, that the propulsion system 114 will be exerting the propulsive force and the surface tension compensation controller 106 may transform the one-dimensional length to a two-dimensional area in three-dimensional space.

For the VTOL aircraft 102 to be valid, the thrust should be greater than the weight (W) of the VTOL aircraft 102:

$$\frac{F_T}{W} \geq 1 \text{ or } F_T \geq W$$

Therefore $$W \leq T = \frac{v * dm}{L * dt}$$

The method 200 may then proceed to block 210 where thrust is generated based on the reaction force determination. In an embodiment, at block 210, the surface tension compensation controller 106 may provide the reaction force to the propulsion controller 116 included in the propulsion system 114. The propulsion controller 116 may distribute the amount of thrust needed to land or takeoff between the one or more engines 118a-118c to cause rotation of the one or more fans 120a-120c. For example, if the VTOL aircraft 102 includes only engine 118a, the engine 118a may be operated to provide the thrust calculated in block 208. However, if there are three engines, as illustrated in the example VTOL aircraft 102, then the thrust may be portioned to each of the three engines. The propulsion controller 116 may determine how much of the total force should be distributed to each of the three engines 118a-118c and operate those engines 118a-118c accordingly. The portion of the thrust force distributed to a particular engine may be based on surface tension of the surface that that engine providing thrust as the surface tension of the surface may not be identical at every location under which the VTOL aircraft 102 is operating. For example, if the VTOL aircraft 102 were landing in water that is turbulent due to waves from the wind or generated by the VTOL or if the VTOL is taking off or landing in swamp where there may be some vegetation protruding from the surface of a body of water, there may be differences in the surface tension at various areas under the VTOL aircraft 102.

In various embodiments, the propulsion system 114 may be adjustable in one or more degrees of freedom. As such, the surface tension compensation controller 106 may provide direction instructions to the propulsion controller 116 or the propulsion controller 116 may determine direction instructions and cause one or more of the engines 118a-118c to provide thrust in direction provided by the direction instructions.

The method 200 may then proceed to block 212 where the landing mode or the takeoff mode is deactivated. In an embodiment, at block 212, the surface tension compensation controller 106 or another controller (e.g., the propulsion controller 116) provided in the VTOL aircraft 102 may deactivate a landing mode or a takeoff mode. For example, the takeoff mode may be deactivated, via the sensor system 112, when the VTOL aircraft 102 does not satisfy one or more takeoff conditions (e.g., the sensor system 112 detects that the aircraft is not on a surface and the VTOL aircraft 102 has reach some predetermined altitude). The landing mode may be deactivated when the VTOL aircraft 102 does not satisfy one or more landing condition (e.g., the VTOL aircraft 102 is descending and has reached a predetermined altitude). In other embodiments, the landing mode or the takeoff mode may be deactivated when a deactivation condition determined. For example, a user may deactivate the landing mode or the takeoff mode via a command through a user interface coupled to the VTOL aircraft 102. While a few examples of deactivating the landing mode or the takeoff mode or activating a flight mode are described, one of skill in the art in possession of the present disclosure will recognize that other conditions may be contemplated when deactivating the landing mode or the takeoff mode or activating a flight mode for the VTOL aircraft 102 and still fall under the scope of the present disclosure.

Figure 3:
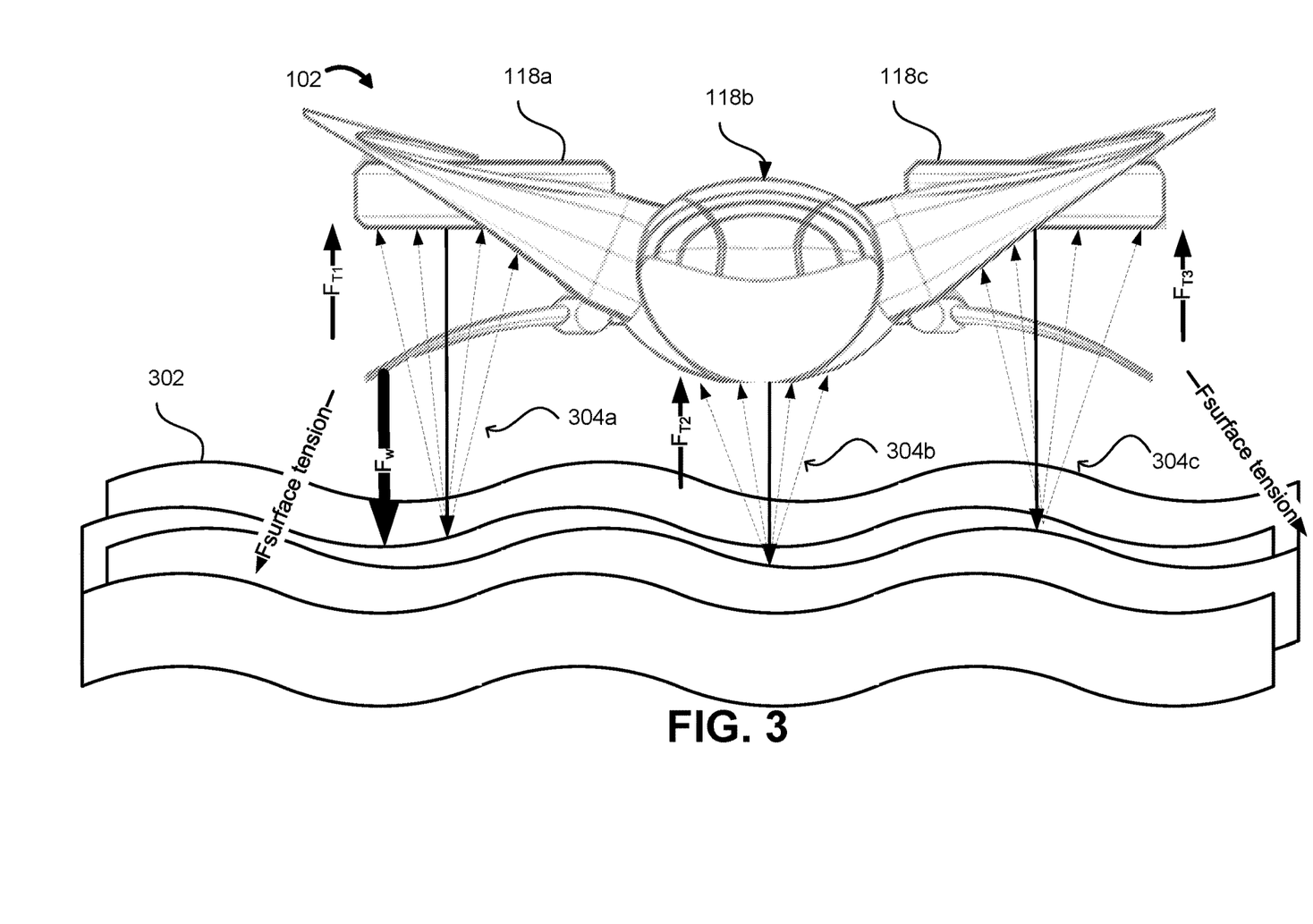
FIG. 3 illustrates the VTOL aircraft from FIGS. 1A-1C during the method of FIG. 2, in accordance with some embodiments of the present disclosure.

FIG. 3 illustrates an example scenario where the VTOL aircraft 102 is landing on a fluid body 302 during the method 200 of FIG. 2. As illustrated, the VTOL aircraft 102 may have activated a landing mode and activated a QELS system that includes three lasers generating laser beams and reflections as indicated by arrows 304a, 304b, and 304c. The thrust force comprising $F_{T1}$, $F_{T2}$, and $F_{T3}$, generated by respective engines 118a, 118b, and 118c to hover or descend the VTOL aircraft 102, may be generated based on one or more surface tension determinations by the QELS system and the weight of the VTOL aircraft 102. As the VTOL aircraft 102 descends, the surface tension of the fluid body 302 adds a greater force pulling on the VTOL aircraft 102. As such, to maintain a rate of descent and stability, the thrust force may be adjust based on the force caused by the surface tension of the fluid body and the VTOL aircraft surface tension compensation system 100 accounts for that additional force, which may not be consistent throughout the area under the VTOL aircraft chassis 104. Even when the VTOL aircraft is not in contact with the fluid body 302, the surface tension of the body of water 302 still has an affect on the force of the VTOL aircraft 102 as the surface tension interacts with the liquid-gas interface of the air between the VTOL aircraft 102 and the fluid body 302.

Thus, systems and methods of the present disclosure provide surface tension compensation in aircraft. By detecting a surface tension of a fluid surface beneath the aircraft, calculations may be made to determine the effect a force caused by surface tension of the surface on the aircraft. A propulsion system may be adjusted based on the surface tension to provide more efficient and stable thrust for a VTOL aircraft when landing or taking off from a fluid surface.

Figure 4:
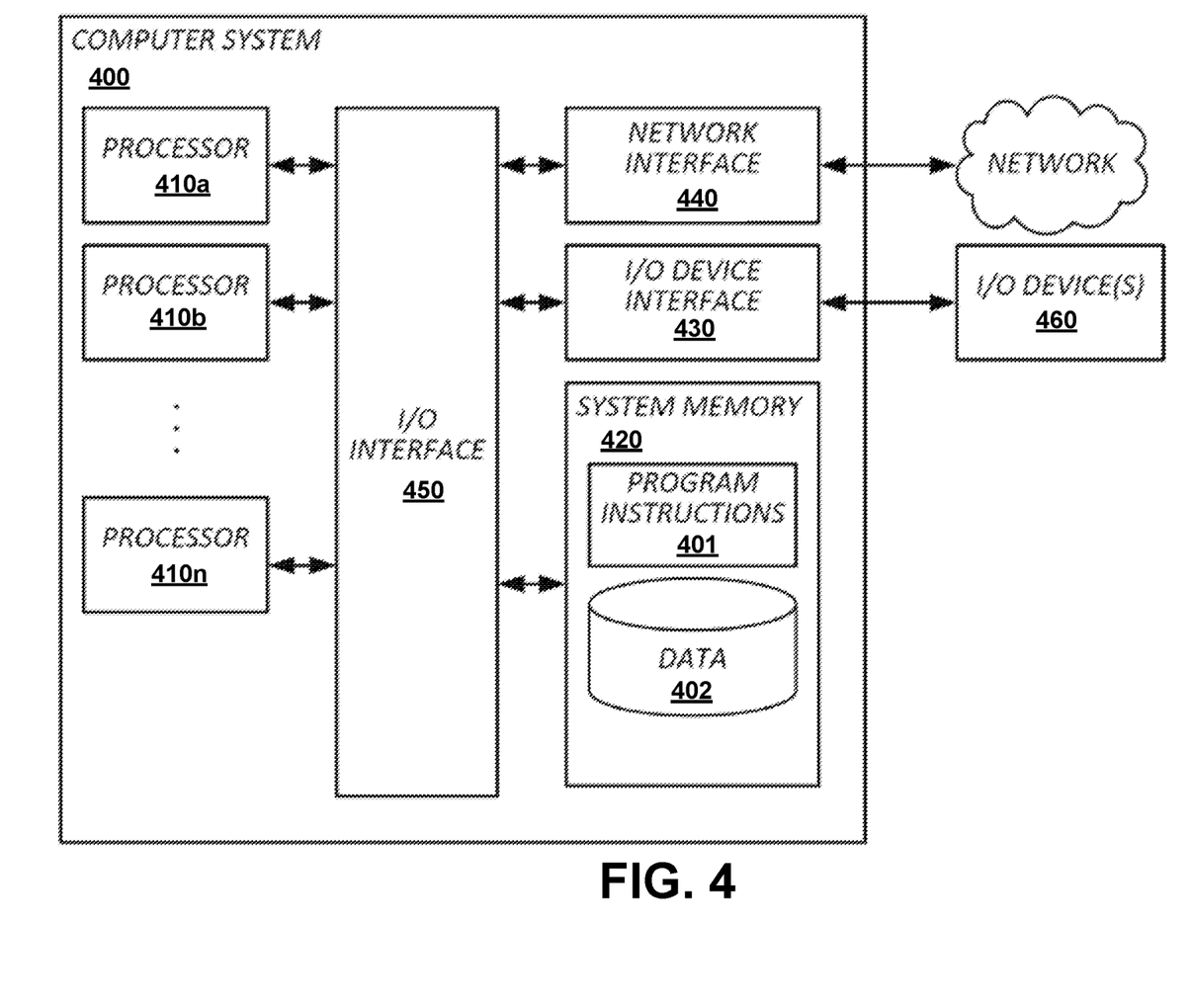
FIG. 4 shows an example of a computing device by which the present techniques may be implemented, in accordance with some embodiments.

FIG. 4 is a diagram that illustrates an exemplary computing system 400 in accordance with embodiments of the present technique. Various portions of systems and methods described herein, may include or be executed on one or more computer systems similar to computing system 400. For example, the VTOL aircraft 102 may include the computing system 400. Further, processes and modules described herein may be executed by one or more processing systems similar to that of computing system 400.

Computing system 400 may include one or more processors (e.g., processors 410a-410n) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a uni-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computer system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computer system 400 through a wired or wireless connection. I/O devices 460 may be connected to computer system 400 from a remote location. I/O devices 460 located on remote computer system, for example, may be connected to computer system 400 via a network and network interface 440.

Network interface 440 may include a network adapter that provides for connection of computer system 400 to a network. Network interface 440 may facilitate data exchange between computer system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 401 or data 402. Program instructions 401 may be executable by a processor (e.g., one or more of processors 410a-410n) to implement one or more embodiments of the present techniques. Instructions 401 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 400 or multiple computer systems 400 configured to host different portions or instances of embodiments. Multiple computer systems 400 may provide for parallel or sequential processing/execution of one or more portions of the techniques described herein.

Those skilled in the art will appreciate that computer system 400 is merely illustrative and is not intended to limit the scope of the techniques described herein. Computer system 400 may include any combination of devices or software that may perform or otherwise provide for the performance of the techniques described herein. For example, computer system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: obtaining, by a computer system and using one or more surface tension sensors, one or more surface tension measurements of a surface; determining, by the computer system, a reaction force for an aircraft using the one or more surface tension measurements and a weight of the aircraft; and causing, by the computer system, one or more engines included in the aircraft to generate thrust based on the reaction force.

2. The medium of embodiment 1, wherein the reaction force is based on whether the aircraft is in a landing mode, a hover mode, or a takeoff mode.

3. The medium of any one of the embodiments 1 and 2, wherein the operations further comprise: activating, by the computer system, the one or more surface tension sensors when the aircraft is in a hover mode, a landing mode, or a takeoff mode.

4. The medium of any one of the embodiments 1-3, wherein the operations further comprise: activating, by the computer system, the hover mode, the landing mode, or the takeoff mode when a respective hover condition, landing condition, or takeoff condition is satisfied.

The medium of any one of the embodiments 1-4, wherein the operations further comprise: deactivating, by the computer system, the one or more surface tension sensors when the aircraft is in a flight mode or not in a hover mode, a landing mode, or a takeoff mode.

6. The medium of any one of the embodiments 1-5, wherein the aircraft is a vertical takeoff and landing aircraft.

7. The medium of any one of the embodiments 1-6, wherein the operations further comprise: determining, by the computer system, a direction for the thrust; and causing, by the computer system, the one or more engines to be positioned in the direction for the thrust.

8. An aircraft, comprising: an aircraft chassis; a propulsion system included in the aircraft chassis, wherein the propulsion system includes one or more engines that generate thrust; a sensor system that is housed by the aircraft chassis and that includes one or more surface tension sensors; one or more processors that are coupled to the propulsion system and the sensor system; and system memory that is coupled to the processing system and that includes one or more instructions that, when executed by the one or more processors, effectuate operations comprising: obtaining, using the one or more surface tension sensors, one or more surface tension measurements of a surface; determining a reaction force for the aircraft using the one or more surface tension measurements and a weight of the aircraft; and causing the one or more engines included in the aircraft to generate thrust based on the reaction force.

9. The aircraft of embodiment 8, wherein the reaction force is based on whether the aircraft is in a landing mode, a hover mode, or a takeoff mode.

10. The aircraft of any one of the embodiments 8 and 9, wherein the operations further comprise: activating the one or more surface tension sensors when the aircraft is in a hover mode, a landing mode, or a takeoff mode.

11. The aircraft of any one of the embodiments 8-10, wherein the operations further comprise: activating the hover mode, the landing mode, or the takeoff mode when a respective hover condition, landing condition, or takeoff condition is satisfied.

12. The aircraft of any one of the embodiments 8-11, wherein the operations further comprise: deactivating the one or more surface tension sensors when the aircraft is in a flight mode or when the aircraft is not in a hover mode, a landing mode, or a takeoff mode.

13. The aircraft of any one of the embodiments 8-12, wherein the one or more engines are positioned on the aircraft chassis for vertical takeoff and landing the aircraft.

14. The aircraft of any one of the embodiments 8-13, wherein the operations further comprise: determining a direction for the thrust; and causing the one or more engines to be positioned in the direction for the thrust.

15. A method, comprising: obtaining, by a computer system and using one or more surface tension sensors, one or more surface tension measurements of a surface; determining, by the computer system, a reaction force for an aircraft using the one or more surface tension measurements and a weight of the aircraft; and causing, by the computer system, one or more engines included in the aircraft to generate thrust based on the reaction force.

16. The method of embodiment 15, wherein the reaction force is based on whether the aircraft is in a landing mode, a hover mode, or a takeoff mode.

17. The method of any one of embodiments 15 and 16, further comprising: activating, by the computer system, the one or more surface tension sensors when the aircraft is in a hover mode, a landing mode, or a takeoff mode.

18. The method of any one of embodiments 15-17, further comprising: deactivating, by the computer system, the one or more surface tension sensors when the aircraft is in a flight mode or not in a hover mode, a landing mode, or a takeoff mode.

19. The method of any one of embodiments 15-18, further comprising steps for obtaining one or more surface tension measurements of a surface.

20. The method of any one of embodiments 15-19, further comprising: determining, by the computer system, a direction for the thrust; and causing, by the computer system, the one or more engines to be positioned in the direction for the thrust.

What is claimed is:

1. A non-transitory, machine-readable medium storing instructions that, when executed by one or more processors, effectuate operations comprising:
   obtaining, by a computer system and using one or more surface tension sensors, one or more surface tension measurements of a landing surface or a takeoff surface for a vertical takeoff and landing aircraft;
   determining, by the computer system, a reaction force for the aircraft using the one or more surface tension measurements; and
   causing, by the computer system, one or more engines included in the aircraft to generate thrust based on the determined reaction force and the weight of the aircraft.

2. The medium of claim 1, wherein the determined reaction force is based on whether the aircraft is in a landing mode, a hover mode, or a takeoff mode.

3. The medium of claim 1, wherein the operations further comprise:
   activating, by the computer system, the one or more surface tension sensors when the aircraft is in a hover mode, a landing mode, or a takeoff mode.

4. The medium of claim 3, wherein the operations further comprise:
   activating, by the computer system, the hover mode, the landing mode, or the takeoff mode when a respective hover condition, a landing condition, or a takeoff condition is satisfied.

5. The medium of claim 1, wherein the operations further comprise:
   deactivating, by the computer system, the one or more surface tension sensors when the aircraft is in a flight mode or not in a hover mode, a landing mode, or a takeoff mode.

6. The medium of claim 1, wherein the operations further comprise:
   determining, by the computer system, a direction for the thrust; and causing, by the computer system, the one or more engines to be positioned in the direction for the thrust.

7. A vertical takeoff and landing aircraft, comprising:
   an aircraft chassis;
   a propulsion system included in the aircraft chassis, wherein the propulsion system includes one or more engines that generate thrust;
   a sensor system that is housed by the aircraft chassis and that includes one or more surface tension sensors;
   one or more processors that are coupled to the propulsion system and the sensor system; and
   system memory that is coupled to the one or more processors and that includes one or more instructions that, when executed by the one or more processors, effectuate operations comprising:
   obtaining, using the one or more surface tension sensors, one or more surface tension measurements of a landing surface or a takeoff surface for the aircraft;
   determining a reaction force for the aircraft using the one or more surface tension measurements; and causing the one or more engines included in the aircraft to generate thrust based on the determined reaction force and a weight of the aircraft.

8. The aircraft of claim 7, wherein the determined reaction force is based on whether the aircraft is in a landing mode, a hover mode, or a takeoff mode.

9. The aircraft of claim 7, wherein the operations further comprise:
   activating the one or more surface tension sensors when the aircraft is in a hover mode, a landing mode, or a takeoff mode.

10. The aircraft of claim 9, wherein the operations further comprise:
    activating the hover mode, the landing mode, or the takeoff mode when a respective hover condition, landing condition, or takeoff condition is satisfied.

11. The aircraft of claim 7, wherein the operations further comprise:
    deactivating the one or more surface tension sensors when the aircraft is in a flight mode or when the aircraft is not in a hover mode, a landing mode, or a takeoff mode.

12. The aircraft of claim 7, wherein the one or more engines are positioned on the aircraft chassis for vertical takeoff and landing the aircraft.

13. The aircraft of claim 7, wherein the operations further comprise:
    determining a direction for the thrust; and
    causing the one or more engines to be positioned in the direction for the thrust.

14. A method, comprising:
    obtaining, by a computer system and using one or more surface tension sensors, one or more surface tension measurements of a landing surface or a takeoff surface for a vertical takeoff and landing aircraft;
    determining, by the computer system, a reaction force for the aircraft using the one or more surface tension measurements; and
    causing, by the computer system, one or more engines included in the aircraft to generate thrust based on the determined reaction force and a weight of the aircraft.

15. The method of claim 14, wherein the determined reaction force is based on whether the aircraft is in a landing mode, a hover mode, or a takeoff mode.

16. The method of claim 14, further comprising:
    activating, by the computer system, the one or more surface tension sensors when the aircraft is in a hover mode, a landing mode, or a takeoff mode.

17. The method of claim 14, further comprising:
    deactivating, by the computer system, the one or more surface tension sensors when the aircraft is in a flight mode or not in a hover mode, a landing mode, or a takeoff mode.

18. The method of claim 14, further comprising:
    determining, by the computer system, a direction for the thrust; and causing, by the computer system, the one or more engines to be positioned in the direction for the thrust.

* * * * *